(12) United States Patent
Edlinger

(10) Patent No.: US 6,196,479 B1
(45) Date of Patent: Mar. 6, 2001

(54) METHOD AND DEVICE FOR GRANULATING AND COMMINUTING LIQUID SLAGS

(75) Inventor: Alfred Edlinger, Baden (CH)

(73) Assignee: "HolderBank"Financiere Glarus AG, Glarus (CH)

(*) Notice: Subject to any disclaimer, the term of this patent is extended or adjusted under 35 U.S.C. 154(b) by 0 days.

(21) Appl. No.: 09/342,625

(22) Filed: Jun. 29, 1999

(30) Foreign Application Priority Data

Jun. 29, 1998 (AT) .................................... 1130/98

(51) Int. Cl.⁷ .................................... B02C 19/12
(52) U.S. Cl. .................... 241/1; 241/5; 241/24.14; 241/39; 241/23; 241/65; 241/79; 241/301
(58) Field of Search ................ 241/1, 5, 35, 40, 241/301, 24.14, 21, 23, 65, 39, 79

(56) References Cited

U.S. PATENT DOCUMENTS 4,909,821 * 3/1990 Olginsky et al. .................... 241/39
5,667,147    9/1997 Edlinger .
5,820,814   10/1998 Doumet .
5,993,510   11/1999 Edlinger .

FOREIGN PATENT DOCUMENTS

| 19522320 | 8/1996 | (DE) . |
| 0829550A1 | 3/1998 | (EP) . |
| 2527940 | 12/1983 | (FR) . |
| WO 95/15402 | 6/1995 | (WO) . |

* cited by examiner

Primary Examiner—Mark Rosenbaum
(74) Attorney, Agent, or Firm—Pillsbury Winthrop LLP

(57) ABSTRACT

In a method for granulating and comminuting liquid slags, especially metal-oxide-containing slags, coal, hydrocarbons, carbon dioxide ($CO_2$) and/or coal/water mixtures or coal slurries are driven into the slag or the slag jet. The liquid slag is transferred into an expansion and granulation chamber and subsequently into a mill, especially a jet or impact mill. In the device for carrying out the method provided with a slag tundish and a lance arranged coaxially to the axis of the tundish tube the tundish tube is designed as a hole-type nozzle. Devices for applying carbon carriers and/or water nozzles are arranged radially outside of the mouth of the tundish tube.

22 Claims, 4 Drawing Sheets

METHOD AND DEVICE FOR GRANULATING AND COMMINUTING LIQUID SLAGS

BACKGROUND OF THE INVENTION

1. Field of the Invention

The invention is relates to a method for granulating and comminuting liquid slags, especially slags containing metal oxides such as, e.g., converter slags or refuse-incineration slags, mixtures of steel- and blast-furnace slags or non-ferrous metallurgic slags, e.g., Cu— or Ni slags as well as to a device for carrying out this method.

2. Description of the Related Art

In an older development of the applicant (GM 94/98) a method already has been disclosed for granulating and comminuting liquid slags in which method pressurized water was driven into the slag melt, especially for the comminution of liquid blast-furnace slags, and the slag brought as a surface of the jet of pressurized water into a grinding chamber. With this method the direct conversion of the internal energy and especially of the perceptible heat of slag melts into grinding operations was directly utilized; however, the older suggestion, in which only water was driven in under high pressure, has a number of limitations with regard to the selection of the slags to be granulated and comminuted. The older method was basically suited primarily for the comminution of blast-furnace slags with only slight amounts of metals or metallic particles produced during the granulation. Blast-furnace slag to be granulated generally has a low amount of residual raw iron which is below 0.5% by weight if the method is carried out properly on the other hand, slags containing metal oxide or iron oxide such as converter slags have considerably greater amounts of residual raw iron and/or readily reducible iron oxides which, in conjunction with water as granulation medium, might bring pose a danger of exploding due to the formation of hydrogen gas. It was therefore suggested for this reason in the older method that the liquid slags be completely oxidized by introducing oxygen in order to increase safety and to saturate the liquid slags with gases in order to improve the communution action.

SUMMARY OF THE INVENTION

Based on this principle of slag microgranulation, which allowed a high degree of rapid comminution to be achieved by means of a sudden expansion of the water core and of the gases dissolved in the slags, the present invention serves to extend the area of application of the principle of the method to any slags and especially to slags containing metal oxides such as, e.g., converter slags or refuse-incineration slags, without taking the risk of oxyhydrogen explosions. The method of the invention is particularly suitable for highly basic slags, which exhibit a strong tendency to devitrify, in the case of which an especially rapid cooling off is necessary in order to maintain the glass structure and should also be able to be used for acidic systems, e.g., fayalithic slag melts.

In order to solve the problem of the invention the method of the invention resides in that the liquid slag is directed into an expansion chamber or granulating chamber, that coal, hydrocarbons, $CO_2$-containing gases and/or coal/water mixtures or coal slurries are introduced into the liquid slag or into the slag jet and are converted at least partially to CO and $H_2$, during which the slag droplets are reduced and cooled, and that the dust mixture of clinker dust and slag dust and metal dust is separated from each other, e.g., by magnetic separation. As a result of the fact that now hydrocarbons or coal/water mixtures are used instead of pure water a strongly reducing atmosphere is created with the energetic advantages of the known method being preserved unchanged. If high-pressure heavy oil or diesel oil or old solvents are used a rapid dissociation or a cracking of the hydrocarbons used occurs during the high-temperature reaction with the liquid slag which results in an especially rapid cooling off of the liquid slag. On the whole, a pyrolytic decomposition of the hydrocarbons takes place thereby which results at the same time in an at least partial reduction of slag. Even when using coal/water mixtures in $CO_2$ suspended coal dust or coal slurries the reducing portion predominates, which portion is assured by the coal content in order to reliably prevent the danger of explosions. At the same time the reducing atmosphere formed during the forcing in [injecting] of coal slurries permits the reducing of metal oxides from metal-oxide-containing slags. In the case of high-pressure hydrocarbons such as, e.g., heavy oils or the like carbon monoxide can be formed by additionally bringing in oxygen and/or water, during which a reducing atmosphere continues on the whole to remain.

The gasification reaction in the crack/gasification chamber acts, so to speak, as a combustion chamber and the propellant gas formed ($C+H_2O \rightarrow CO+H_2$) accelerates the slag granulate. An addition of water in such a combustion chamber, in which only a partial combustion takes place, directly permits the formation of synthesis gas and water gas. At the same time, with a rapid cooling off and disintegration under formation of especially fine-grained solids a reduction of slag can thus be carried out and formed metal dust separated off.

The method in accordance with the invention is advantageously carried out in such a manner that hydrocarbons in the form of a jet of heavy oils, diesel oils or old solvents under a pressure of above 15 bar, especially 30 to 260 bar are used. It is advantageous if high-pressure water is driven alternately or simultaneously with coal dust or hydrocarbons into the liquid slag.

A method is particularly advantageous here in which water vapor or $CO_2$ is driven in under a pressure of 3 to 30 bar coaxially to the mouth of the slag exit and the slag jet is charged after leaving the mouth with carbon carriers, especially coal and pressurized water, or coal dust fluidized in $CO_2$. In such a method high shear forces act on the slag jet without an appreciable cooling off by the vapor taking place; the subsequent charging of carbon yields the desired gasification and the desired, rapid solidification by means of the pressurized water applied.

As already mentioned, carbon monoxide can be formed by the additional introduction of oxygen, $CO_2$ and/or water. It is preferable to proceed in such a manner to this end that the slag jet is charged with $O_2$, $CO_2$ and/or $H_2O$ for developing CO and $CO+H_2$ and that the granulated slag is introduced together with the CO or cracked gas formed into the grinding chamber of a jet mill or impact mill. $CO_2$ is converted thereby with C to CO.

An especially good comminution and a valuable end product can be achieved in that the slags are adjusted to a basicity ($CaO/SiO_2$) between 0.2 and 3.8, especially 2.8 to 3.6 and are introduced with this basicity.

In order to improve the thermal efficiency the driving out of the liquid slags can take place with hot waste combustion gases. Superheated water vapor with temperatures of above 1200° C., especially 1450° C., is preferably used to atomize the liquid slags.

The reduction of the atomized slags is preferably carried out thereby at temperatures of 600° C. to 1600° C. in a fluidized bed.

With regard to the metal dust being produced the cooled dusts are preferably cooled off under an inert atmosphere to below 100° C. Preferably carbon in an amount of 250 to 300 kg/t slag is introduced into the cooling chamber for the reduction.

In an especially preferred device for carrying out the method with a slag tundish and a lance arranged coaxially to the axis of the tundish tube, the tundish tube being designed as a hole-type nozzle, and devices for applying carbon carriers and/or water jets are arranged radially outside of the mouth of the tundish tube. If necessary, the comminuted product can be subsequently ground in a conventional manner.

On the whole, carrying out the method of the invention makes it possible to significantly reduce the consumption of water during the granulating of liquid slags or to eliminate it if $CO_2/C$ is used and at the same time to carry out reduction work.

BRIEF DESCRIPTION OF THE DRAWINGS

The invention is explained in detail in the following description using a device for carrying out the method, which device is schematically shown in the drawings, and using exemplary embodiments.

DETAILED DESCRIPTION OF PREFERRED EMBODIMENTS OF THE INVENTION

Figure 1:
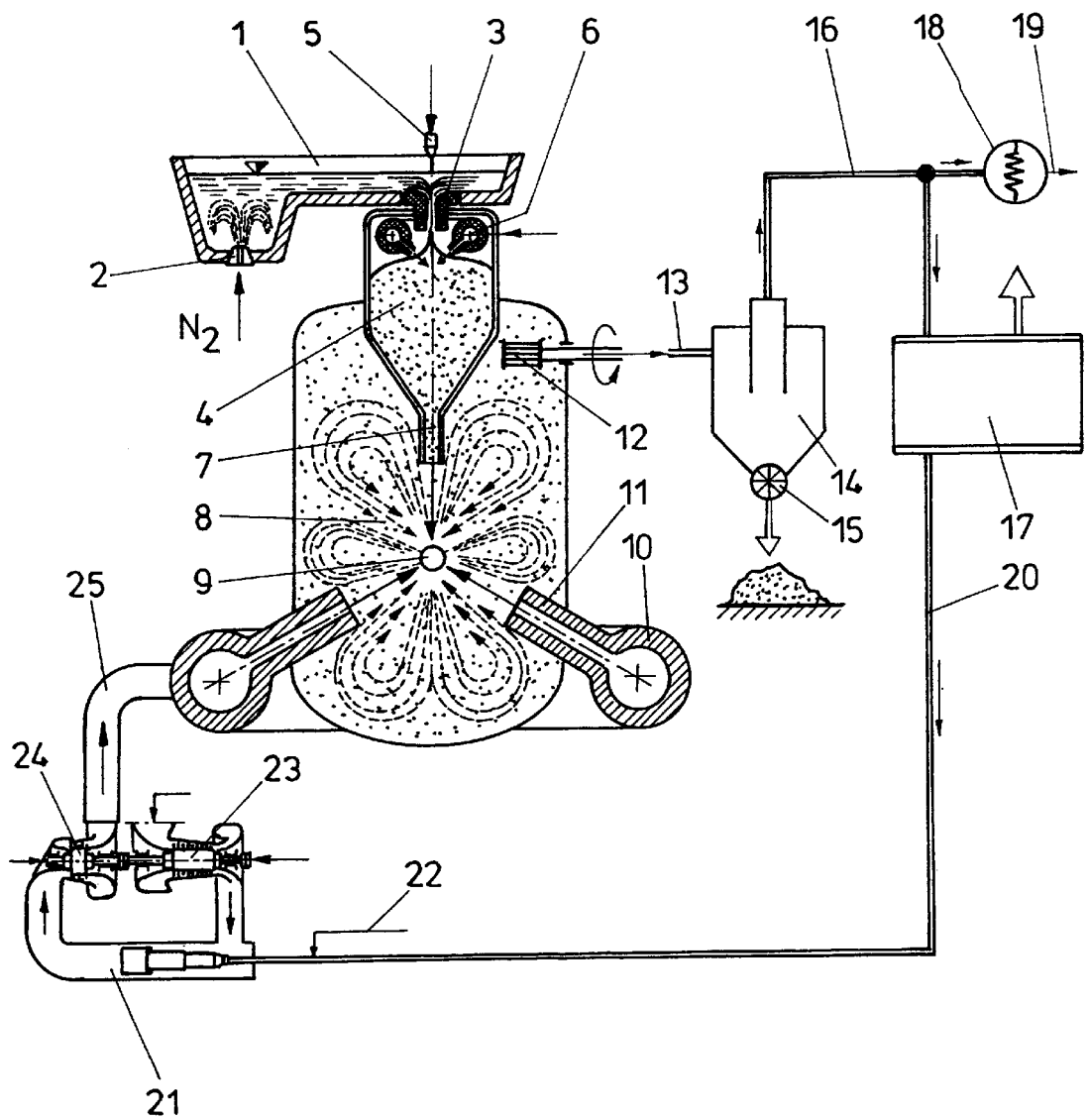
FIG. 1 is a schematic view of a first embodiment of a device suitable for carrying out the method of the invention.

In FIG. 1 a slag funnel is designated by 1 in which liquid slag is placed. At the lowest position of the slag funnel, inert gas is introduced via sink 2 to the extent this is desired. The saturation of the slag with gases has advantages in the disintegration which follows since the gas contained in the slag contributes during cooling to a sudden expansion and therewith to an intensive comminution.

The liquid slag passes via slag outlet 3 into an expansion chamber 4. Lance 5 is arranged above slag outlet 3 and via the lance, pressurized oil is driven coaxially to the opening of slag outlet 3 under a pressure of 15 to 160 bar into the slag bath. The liquid slag passes subsequently as a surface of a jet of pressurized oil into expansion chamber 4, during which a thermal decomposition and a cracking of the pressurized oil begins on account of the temperature of the liquid slag. The decomposition enthalpy results in a rapid cooling off and therewith in a rapid granulation of the liquid slag during which water and/or oxygen and/or $CO_2$-containing waste gas is additionally sprayed into the expansion chamber as oxygen carrier. Concurrently with the carbon arising during the decomposition of the pressurized oil a conversion to carbon monoxide takes place, and with regard to the hydrogen content of heavy oils, to hydrogen, during which the composition of the cracked gas can be further varied by adding water.

The granulated and very extensively cooled-off slag particles pass in solid form via exit opening 7 of decomposition and expansion chamber 4 into a following countercurrent jet mill 8 whose central grinding zone or whose grinding point is designated by 9. Jets of pressurized gas are directed onto this grinding point from ring conduit 10 via appropriate nozzles 11 so that an intensive mechanical collision of the particles occurs and therewith a high grinding effect is assured.

The very highly comminuted product is drawn off via air separator 12 and passes via line 13 into dust separator 14 designed as a cyclone. The fine separated material is removed via drain 15 and also contains amounts of metal dust in addition to comminuted clinker dust, given appropriately reducing conditions with reducible slags, which amounts of metal dust can be subsequently separated off by suitable measures such as, e.g., magnetic separation or air separation.

The very highly purified gas, which is present as synthesis gas with a high amount of carbon monoxide and hydrogen, passes via line 16 into gas turbine 17 in which the pressure of the synthesis gas is raised. A part of the synthesis gas, and especially excess gas can be drawn off thereby as export gas for a thermal utilization in heat exchanger 18 via line 19.

The compressed synthesis gas passes via line 20 to combustion chamber 21 into which waste water can be charged via line 22. A combustion of the synthesis gas takes place in the combustion chamber under the feeding in of compressed air, to which end air compressor 23 is provided. Air compressor 23 can itself be driven via waste-gas turbine 24 via which the waste combustion gases are conducted. These waste combustion gases are subsequently supplied via line 25 to ring conduit 10 and therewith to nozzles 11 for the countercurrent jet mill.

In this design the high dissociation energy and crack energy of pressurized oils, especially of used oils or used industrial solvents is utilized for a rapid cooling off and therewith for a glass-like solidification of the slag.

Figure 2:
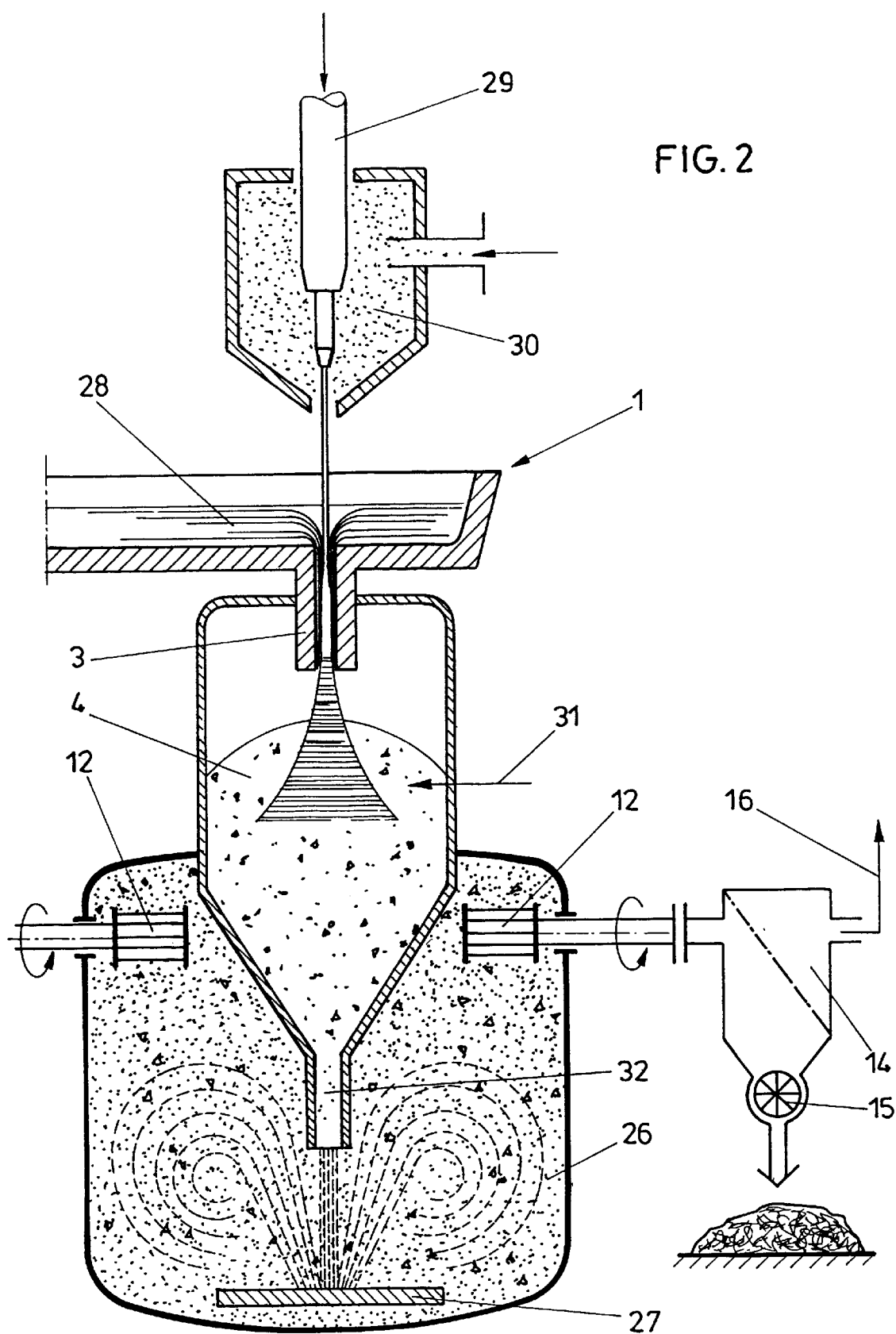
FIG. 2 illustrates a modified design for introducing coal/water mixtures.

In the design according to FIG. 2, impact mill 26 is used instead of a countercurrent jet mill. The solidified particles leaving expansion and decomposition chamber 4 are cast against armored impact plate 27 and are comminuted in this manner.

In deviation from the design of FIG. 1, coal dust is driven together with high-pressure water into slag melt 28 in slag tundish 1. High-pressure water lance 29 is provided for this purpose, via which coal dust is drawn out of injector chamber 30 in accordance with the injector principle. The jet is again oriented coaxially to slag exit 3 and a very extensive combustion of the introduced carbon takes place subsequently in the expansion chamber. The composition of the waste combustion gas being produced can be regulated by means of a suitable supplying of oxygen and/or water via line 31 following the gasification of the slag. In addition to synthesis gas $CO_2$ and water vapor can be formed here by means of an appropriate postcombustion with oxygen so that the acceleration energy required for the subsequent comminution can be made available.

The exit out of composition chamber and expansion chamber 4 can be designed as multiphase acceleration nozzle 32. The comminuted material is again discharged via separator 12 and subsequent dust collecting device 14. Drain 15 can be designed, e.g., as a vacuum drain.

Again, from the dust collecting equipment, hot combustion gases can be withdrawn over line 16 and correspondingly can again be used.

Figure 3:
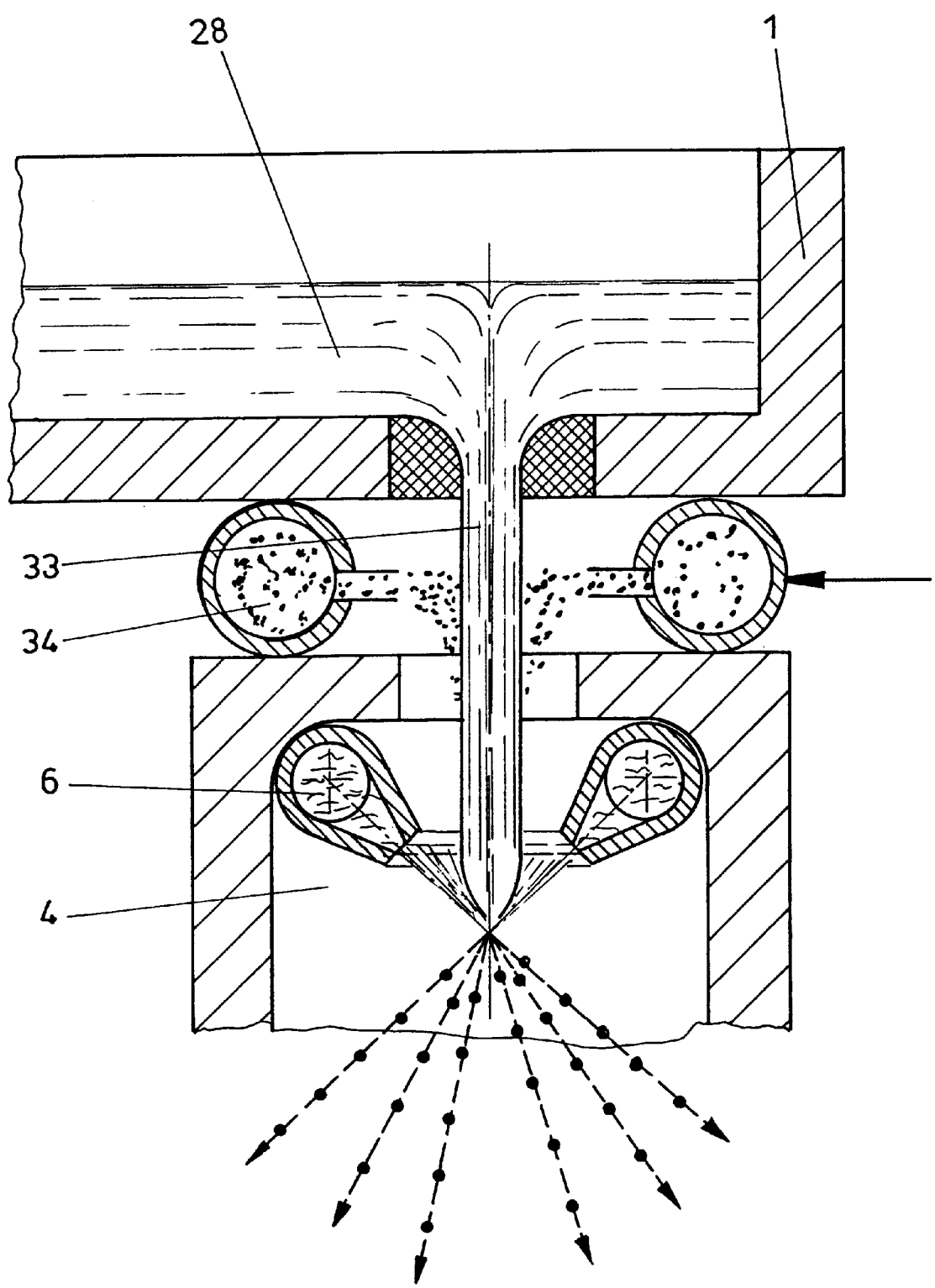
FIG. 3 illustrates details of the slag inlet for the charging of fluidized coal powder onto the slag.

In the design according to FIG. 3, which shows only details of the slag inlet, slag tundish 1 can again be seen in which liquid slag melt 28 is present. The slag leaves the tundish in the form of slag jet 33 onto which fluidized coal powder which had been fluidized, e.g., with water vapor or $CO_2$ is applied via ring nozzle 34. The jacket surface of the slag jet acts in a reducing manner in this way so that the subsequent reaction with water can take place without danger of the formation of detonating gas. Again, ring nozzles 6 for the supplying of high-pressure water are arranged at the entrance of expansion and combustion chamber 4 which nozzles form a high-pressure cone of water. The slag jet is atomized by this cone of water and broken down into small particles under formation of water gas on account of the rapid cooling. Such water gas or synthesis gas again consists largely of carbon monoxide and hydrogen and can be used in the manner described in detail with respect to FIG. 1 within the framework of the countercurrent jet mill of the invention.

Figure 4:
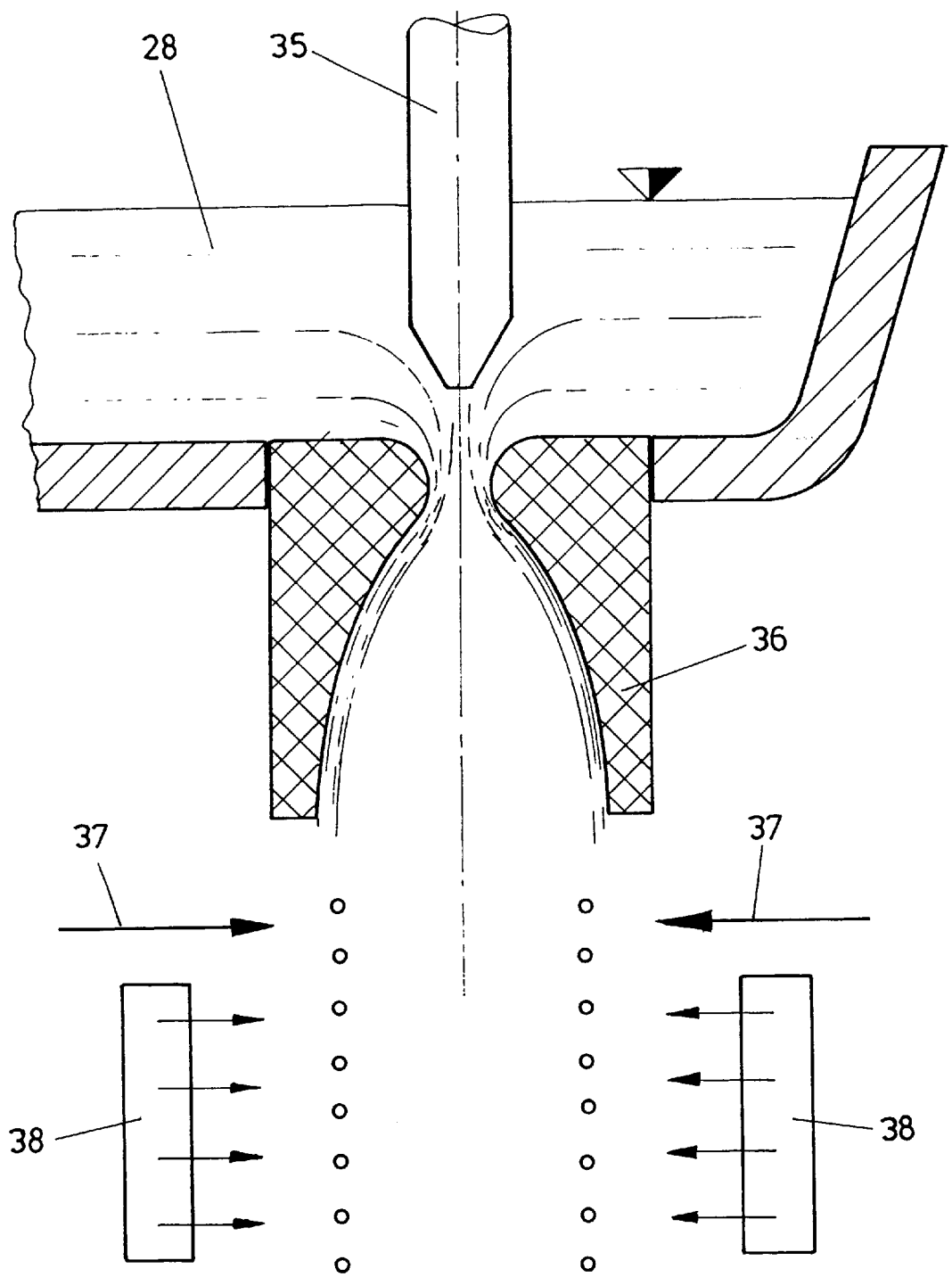
FIG. 4 illustrates a modified design for introducing vapor into the liquid slag.

In the especially preferred design according to FIG. 4, water vapor is charged via pressurized vapor lance 35 under a pressure of approximately 15 bar into the slag coaxially to tundish tube 36. The high-pressure water vapor is surrounded thereby by a surface of liquid slag. An exceedingly great difference in the flow rate arises between the slag and the vapor current. The high shear forces which appear as a result tear the slag jet into exceedingly fine slag droplets. The tundish tube is designed as a Laval nozzle and vapor flow rates in the supersonic range are observed. Practically no heat exchange takes place between the slag jet and the water vapor and the water vapor accelerates the slag jet. The high forces of acceleration result in extremely fine slag droplets in the range of approximately 50 to 350 $\mu m$ at the given surface tension of the slag melt. The exceedingly large surface of these slag droplets formed in this manner can subsequently be converted with water mist and/or carbon into an exceedingly rapid heat- and substance exchange, during which the high-pressure vapor serves primarily for overcoming the counterpressure and the momentum exchange of operating steam/slag of the gasification chamber. Since a heat exchange does not take place between high-pressure vapor and slag melt the risk of the slag freezing in the tundish tube is also significantly reduced.

Coal dust can be applied onto the extremely fine slag droplets via a series of openings 37 immediately after they leave the tundish tube. The water mist is produced in a spray box designated schematically with 38. Extremely fine water droplets are formed in this spray box at water pressures of, e.g., 2 to 8 bar which have as a consequence a rapid cooling off and solidification of the fine slag particles and a rapid gasification of the introduced coal dust. The operating-steam jet tube (steam pressure approximately 15 bar) is positioned into the slag melt coaxially to the tundish nozzle. E.g., 150 kg steam per t slag are blown in. No heat exchange takes place between the operating steam and the melt. The driving jet expands in the supercritical hole-type nozzle against 5 bar to supersonic speed. Slag melt is drawn into the tundish nozzle by the injector effect (if the system is directed downward. Of course, an upwardly directed system is also conceivable).

Very high relative speeds occur between the vapor jet expanding at supersonic speed and the slag droplets. This results in very great shear forces. On account of surface tension and viscosity conditions of the slag melt the very high shear forces should suffice for forming slag droplets in the micrometer range.

These slag droplets are cooled off very rapidly after exiting out of the hole-type nozzle by means of water (mist) evaporation and/or the formation of water gas ($C+H_2O$+slag heat $CO+H_2$), during which very great energy-and substance-flow densities are achieved on account of extreme surface conditions.

The invention is explained in detail in the following using exemplary embodiments.

EXAMPLE 1

1 t slag melt contains at 1500° C. an inner energy (heat) of 2250 KJ/kg. The slag temperature was lowered by the granulation process from 1500° C. to 500° C. This signifies the removal of 1500 KJ/kg slag. In order to remove the amount of heat 150 kg coal must therefore be converted to water gas per t slag. For this, 225 kg water per t slag are required and 345 kg CO and 25.5 kg $H_2$ are produced, that is, a total of approximately 370 kg corresponding to 296 $Nm^3$ water gas or 840 $m^3$ (at 500° C.) (93% by weight CO and 7% by weight $H_2$).

Under the assumption that the slag comprises no reducing components, e.g., in the case of blast-furnace slag, the combustion of these 370 kg water gas yields an energy amount of 3700 MJ or approximately 1000 KWh. However, for fine grinding of the slag a maximum of 200 KWh/t slag are required.

In order to balance out the process energetically, e.g., clinkers can be ground in. The specific amount of water can also be raised and the amount of coal dust lowered so that a gas is produced which corresponds exactly from the energetic standpoint to the expenditure [amount] of grinding.

This gas is converted, e.g., directly in a combustion chamber into the propellant.

In order to cool down 1 t slag melt from 1500° C. to 500° C. a maximum of 150 kg coal and a minimum of 225 kg water are required.

The following can be roughly extrapolated from these considerations:

Given the assumed 200 KWh/t requirement of slag grinding work (corresponding to the "chemically bound gas energy") the requirement of coal of 30 kg/t slag and of water of 718 kg/t slag results. This data (coal/water) is thus adjusted to the specific requirement of grinding work of 200 KHh/t slag. The energy content of the water vapor, which is high, has not yet been taken into consideration thereby.

The introduction of coal can now take place either in the form of hydrocarbons or a common introduction of hydrocarbons or coal dust with high-pressure water. The following considerations result for the use of high-pressure hydrocarbon jets, e.g., in the form of butane:

If 150 kg butane are blown per t slag the slag temperature drops from 1500° C. to 1282° C. and 124.5 kg carbon and 25.5 kg hydrogen are produced. The gasification of 124.5 carbon requires 1.345 MJ of thermal energy from the slag melt.

The slag melt has at 1282° C. an energy content of 1.867 MJ/t at a specific heat cp=1.5 KJ/kg K. According to the above water-gas reaction the slag has an energy content of only 1.867 MJ (pyrolysis)−1.245 MJ (from the formation of water gas)=622 MJ/kg slag.

A final slag temperature of 427° C. is calculated therefrom.

186.75 kg water are required for gasification of the 124.5 kg of pyrolysis carbon formed.

Thus, 150 kg butane and 187 kg water are required for the granulation of 1 t slag melt in order to lower the slag temperature from 1500° C. to 427°C. 25.5 kg pyrolysis-hydrogen+21.16 kg water-gas-hydrogen are produced thereby, a total of 47.1 kg hydrogen and 286.4 kg Co.

Thus, on the whole 333.5 kg cracked gas are produced per t slag.

The cracked gas formed then has the following composition:

14.12% by weight hydrogen and 85.59% by weight carbon monoxide.

This cracked gas can subsequently be used for direct reduction and the production of propellant for a jet iill.

Another economical variation of the utilization of slag energy succeeds in that coal powder is put on the high-pressure water jet. Such a suspension of coal-dust and water can be introduced likewise; an excess cracked gas and especially a $CO/H_2$ mixture remains following a grinding process under reducing conditions. Such an excess $CO/H_2$ mixture could be subjected immediately to a subsequent "Fischer-Tropsch synthesis". The "Fischer-Tropsch synthesis" requires metallic iron or cobalt as catalyst. If slags containing iron oxide are used, iron dust is immediately formed under the reducing conditions and the "Fischer-Tropsch synthesis" subsequently permits the synthesis of high-quality hydrocarbons. In particular, longer-chain hydrocarbons such as benzine can be synthesized thereby.

The direct reduction during the grinding process results at the same time in an advantageous carburization of the iron powder or iron sponge formed by the addition or the formation of hydrocarbons. Carburized, directly reduced iron is distinguished from conventional iron sponge formed in direct reduction in that it is no longer pyrophoric.

EXAMPLE 2

Blast-furnace slag (HOS), steel slag (SS), bauxite and iron ore with the following composition were used as charge:

| component | (%) |
|---|---|
| HOS | |
| Cao | 36 |
| MgO | 10 |
| $SiO_2$ | 43 |
| $Al_2O_3$ | 8 |
| § | 2 |
| $CaO/SiO_2 = 0.84$ | |
| SS | |
| Cao | 52 |
| MgO | 2 |
| $SiO_2$ | 14 |
| $Al_2O_3$ | 1 |
| FeO | 28 |
| $Cr_2O_3$ | 0.1 |
| $P_2O_5$ | 2.5 |
| $CaO/SiO_2 = 3.71$ | |
| bauxite | |
| $Al_2O_3$ | 95% |
| iron ore | |
| $Fe_2O_3$ | 91% |

In order to obtain a high-grade "cement slag" a target basicity ($CaO/SiO_2$) of 1.3 and an $Al_2O_3$ content of 12% is striven for. That means that 1.7 parts by weight HOS must be mixed with 1 part by weight SS in a liquid state under exothermic reaction with one another. The slag mixture is therefore composed of 63% by weight HOS and 37% by weight SS with subsequent guide analysis of the mixed slag (MS):

| MS | |
|---|---|
| component | (%) |
| Cao | 41.92 |
| MgO | 7.04 |
| $SiO_2$ | 32.27 |
| $Al_2O_3$ | 5.41 |
| § | 1.26 |
| FeO | 10.36 |
| $Cr_2O_3$ | 0.037 |
| $P_2O_5$ | 0.925 |
| $CaO/SiO_2 = 1.3$ | |

This mixed slag is compounded with bauxite so that the reduced final slag has the desired $Al_2O_3$ content of 12%.

For reasons of reduction economy the addition of iron ore ($Fe_2O_3$) can become very logical in order to utilize the reduction gas ($CO+H_2$) being produced. Moreover, the addition of iron ore reduces the dynamic melting viscosity as well as the surface tension quite significantly so that the subsequent slag spraying into the "reduction-granulating chamber" results in extremely fine microgranulate.

Hot gas ($CO_2$) is produced in a combustion chamber (cyclone) by the combustion of C, the ash of the coal dust melted jointly with the additives bauxite and iron ore and driven as additive melt jointly with the hot gas into a lengthened tundish exit tube. A superpressure of a maximum of 10 bar prevails in the combustion chamber. The substance exchange and energy exchange take place in the heating tube, as a result of which the momentum exchange is further elevated by the additive melt. Coal dust is introduced into the reduction quench by means of cold $CO_2$ as carrier gas.

The Boudouard reaction takes place at once in the reduction quench:

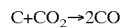

$$C+CO_2 \rightarrow 2CO$$

which is actuated by the energy charge of slag melt and hot propellant.

As a result of the gasification reaction (formation of CO) as well as of the immediately beginning reduction of the slag iron oxide the temperature in the quenching chamber drops suddenly to approximately 600° C., which results in the "microgranulation" as well as the formation of metallic iron powder.

The slag (powder) then has the following composition:

| final slag | |
|---|---|
| component | (%) |
| Cao | 43 |
| MgO | 7.04 |
| $SiO_2$ | 33 |
| $Al_2O_3$ | 12.4 |
| S | 1.26 |
| $Cr_2O_3$ | 0.03 |
| $P_2O_5$ | 0.8 |

In this "anhydrous" method the sulfur remains bound in the slag, which results in advantages of cement technology and ecology. The $Cr_2O_3$ content is hygienically harmless with approximately 300 ppm—it is below the cement norm/average cement values.

What is claimed is:

1. A method for granulating and comminuting slag containing metal oxides, said method comprising:

injecting the slag into an expansion chamber or granulating chamber, the slag being in a form selected from the group consisting of a liquid slag and a slag jet;

passing into the slag a coal slurry or at least one member selected from the group consisting of coal, hydrocarbons, $CO_2$-containing gases, and mixtures comprising coal and water, and converting at least part of said coal slurry or at least one member into CO and $H_2$ while forming slag droplets and reducing and cooling the slag droplets to thereby obtain a granulated slag;

processing the granulated slag to form a dust mixture comprising clinker dust, slag dust, and metal dust; and separating the clinker dust, slag dust, and metal dust from each other.

2. The method of claim 1, wherein the slag comprises converter slags.

3. The method of claim 1, wherein the slag comprises refuse-incineration slags.

4. The method of claim 1, wherein said separating is performed via magnetic separation.

5. The method of claim 1, further comprising driving oil containing hydrocarbons into the slag to create the slag jet, wherein said injecting of the slag comprises injecting the slag jet into the expansion chamber or granulating chamber.

6. The method of claim 5, wherein the oil comprises heavy oils, diesel oils, or old solvents.

7. The method of claim 5, wherein said driving of the oil is conducted at a pressure of above 15 bar.

8. The method of claim 7, wherein the pressure is in a range of from 30 bar to 260 bar.

9. The method of claim 1, wherein said passing further comprises driving high pressure water into the slag.

10. The method of claim 1, wherein the slag jet is injected into the expansion chamber or granulating chamber as a hollow cylindrical layer, and further wherein the hollow cylinder has a coaxial surface layer comprising at least one member selected from the group consisting of hydrocarbons and mixtures of coal and water.

11. The method of claim 1, wherein the slag jet is injected into the expansion chamber or granulating chamber via a slag exit, wherein said method further comprises:

driving water vapor or $CO_2$ into the slag jet under a pressure of 3 to 30 bar coaxially to the slag exit; and charging the slag jet with carbon carriers as the slag jet exits the slag exit.

12. The method of claim 11, wherein the carbon carriers comprise coal and pressurized water.

13. The method of claim 1, further comprising loading a surface of the slag jet with at least one member selected from the group consisting of $O_2$, $CO_2$, and $H_2O$, and introducing the granulated slag into a grinding chamber of a jet mill or impact mill.

14. The method of claim 1, further comprising adjusting a basicity ($CaO/SiO_2$) of the slag between 0.2 to 3.8.

15. The method of claim 1, further comprising adjusting a basicity ($CaO/SiO_2$) of the slag into a range of from 2.8 to 3.6.

16. The method of claim 1, further comprising atomizing the slag with superheated water vapor above 1200° C. in temperature.

17. The method of claim 1, further comprising atomizing the slag with superheated water vapor above 1450° C. in temperature.

18. The method of claim 1, wherein said reducing of the slag is carried out in a fluidized bed at 600° C. to 1600° C. in temperature.

19. The method of claim 1, further comprising cooling the dust mixture in an inert atmosphere to below 100° C. in temperature.

20. The method of claim 1, further comprising introducing carbon into a cooling chamber in which said cooling of the dust mixture takes place in an amount of 250 to 300 kg/ton of the slag.

21. A device for carrying out the granulation and comminuting of slag containing metal oxides, said device comprising:

a slag tundish tube designed as a hole-type nozzle and having a mouth and either an expansion chamber or a granulation chamber;

a lance arranged coaxially with the slag tundish for generating a liquid slag or slag jet, and for injecting the liquid slag or slag jet through the mouth and into either the expansion chamber or the granulation chamber of the slag tundish tube; and a radial injector arranged radially outside of the mouth of the tundish tube, said radial injector comprising water nozzles and/or means for applying carbon carriers, said radial injector passing into the slag a coal slurry or at least one member selected from the group consisting of coal, hydrocarbons, $CO_2$-containing gases, and mixtures comprising coal and water and converting at least part of the coal slurry or at least one member into CO and $H_2$ while forming slag droplets and reducing and cooling the slag droplets to thereby obtain a granulated slag.

22. The device of claim 21, further comprising a system for processing the granulated slag to form a dust mixture comprising clinker dust, slag dust, and metal dust, and for separating the clinker dust, slag dust, and metal dust from each other.

* * * * *